(12) United States Patent
Ozay et al.

(10) Patent No.: US 11,440,543 B2
(45) Date of Patent: Sep. 13, 2022

(54) PREFIX-BASED BOUNDED-ERROR ESTIMATION WITH INTERMITTENT OBSERVATIONS

(71) Applicant: The Regents of the University of Michigan, Ann Arbor, MI (US)

(72) Inventors: Necmiye Ozay, Ann Arbor, MI (US); Sze Zheng Yong, Mesa, AZ (US); Kwesi J. Rutledge, Ann Arbor, MI (US)

(73) Assignee: THE REGENTS OF HTE UNIVERSITY OF MICHIGAN, Ann Arbor, MI (US)

( * ) Notice: Subject to any disclaimer, the term of this patent is extended or adjusted under 35 U.S.C. 154(b) by 796 days.

(21) Appl. No.: 16/256,270

(22) Filed: Jan. 24, 2019

(65) Prior Publication Data

US 2020/0238987 A1 Jul. 30, 2020

(51) Int. Cl.
*B60W 50/02* (2012.01)
*B60W 30/14* (2006.01)
(Continued)

(52) U.S. Cl.
CPC .......... *B60W 30/146* (2013.01); *B60W 50/02* (2013.01); *B60W 50/06* (2013.01);
(Continued)

(58) Field of Classification Search
CPC .... B60W 30/146; B60W 50/02; B60W 50/06; B60W 2050/0052; B60W 2420/52; G01S 17/931; G01S 17/89
(Continued)

(56) References Cited

U.S. PATENT DOCUMENTS 8,896,660 B2 11/2014 Aliaga et al.
8,954,198 B2 * 2/2015 Mansfield ................ F03G 7/08
700/286
(Continued)

FOREIGN PATENT DOCUMENTS

WO WO-2007147166 A2 * 12/2007 ............... G06N 5/02

OTHER PUBLICATIONS

Antunes, Claudia, Sequential Pattern Mining With Approximated Constraints, (Year: 2004).*
(Continued)

*Primary Examiner* — Richard A Goldman
(74) *Attorney, Agent, or Firm* — Quarles & Brady LLP (57) ABSTRACT

A method of the disclosure implements a prefix-based estimator system. The method includes: receiving a plurality of vehicle states at a plurality of time points from at least one sensor coupled to a vehicle, wherein each of the plurality of vehicle states includes at least one parameter information and a discrete state; determining a most recent vehicle state of the plurality of vehicle states has at least one parameter information missing; identifying a prefix comprising a missing data pattern that matches a sequence of discrete states of a subset of time-ordered vehicle states including the most recent vehicle state, wherein the subset of time-ordered vehicle states correspond to the prefix; calculating an estimated updated vehicle state of the vehicle using an optimized prefix-based dynamic estimator based on the prefix and the subset of time ordered vehicle states; and providing the estimated updated vehicle state to a driving control system of the vehicle.

20 Claims, 4 Drawing Sheets

(51) Int. Cl.
  *B60W 50/06* (2006.01)
  *G01S 17/89* (2020.01)
  *G01S 17/931* (2020.01)
  *B60W 50/00* (2006.01)

(52) U.S. Cl.
  CPC ............ *G01S 17/89* (2013.01); *G01S 17/931* (2020.01); *B60W 2050/0052* (2013.01); *B60W 2420/52* (2013.01)

(58) Field of Classification Search
  USPC .......................................................... 701/98
  See application file for complete search history.

(56) References Cited

U.S. PATENT DOCUMENTS

| | | | |
|---|---|---|---|
| 2003/0189904 A1 | 10/2003 | Li | |
| 2005/0091176 A1* | 4/2005 | Nishiuma | G06Q 10/04 706/45 |
| 2008/0119983 A1* | 5/2008 | Inbarajan | G07C 5/008 701/36 |
| 2010/0207754 A1* | 8/2010 | Shostak | B60C 23/041 340/450 |
| 2014/0005907 A1 | 1/2014 | Bajpai | |
| 2015/0003744 A1* | 1/2015 | Kawabata | G06K 9/00 382/206 |
| 2015/0120174 A1* | 4/2015 | Lewis | G08G 1/0112 701/118 |
| 2016/0305848 A1* | 10/2016 | Boggio | G06Q 10/20 |
| 2017/0236052 A1* | 8/2017 | Israelsson | G08G 1/0129 706/21 |
| 2017/0297565 A1* | 10/2017 | Joyce | B60W 50/029 |
| 2018/0136000 A1* | 5/2018 | Rasmusson, Jr. | G01C 21/365 |
| 2018/0259954 A1* | 9/2018 | Schwarz | G05D 1/0055 |
| 2019/0049172 A1* | 2/2019 | Beasley | G08G 1/13 |
| 2019/0138007 A1* | 5/2019 | Baghsorkhi | G08G 1/091 |
| 2019/0213429 A1* | 7/2019 | Sicconi | G06F 3/016 |
| 2019/0228240 A1* | 7/2019 | Stamatopoulos | G08G 1/0129 |
| 2019/0339416 A1* | 11/2019 | Elkabetz | G08G 5/025 |
| 2019/0354643 A1* | 11/2019 | Shum | G06F 30/12 |
| 2020/0238987 A1* | 7/2020 | Ozay | B60W 50/0225 |
| 2020/0263996 A1* | 8/2020 | Gokhale | G01S 17/89 |
| 2020/0273052 A1* | 8/2020 | Ganti | G06N 20/00 |
| 2021/0012593 A1* | 1/2021 | Hassaan | G07C 5/0816 |
| 2021/0107501 A1* | 4/2021 | Monteil | B60W 40/09 |

OTHER PUBLICATIONS

Lauer, Fabien, Global Optimization for low-dimensional switching liner regression and bounded-error estimation (Year: 2017).*

Megretski, Alexandre. Multivariable Control Systems (Year: 2004).*

D. Bertsekas and I. Rhodes. Recursive state estimation for a set-membership description of uncertainty. IEEE Transactions on Automatic Control, 16(2):117-128, 1971.

D. Bertsimas, D. Brown, and C. Caramanis. Theory and applications of robust optimization. SIAM review, 53(3):464-501, 2011.

F. Blanchini and M. Sznaier. A convex optimization approach to fixed-order controller design for disturbance rejection in SISO systems. IEEE Transactions on Automatic Control, 45(4):784-789, Apr. 2000.

F. Blanchini and M. Sznaier. A Convex Optimization Approach to Synthesizing Bounded Complexly $\ell^\infty$ Filters. IEEE Trans. on Automatic Control, 57(1):219-224, 2012.

K. Habib. ODI Resume Report on Investigation PE 16-007 concerning Tesla automatic vehicle control systems. Technical report, NHTSA Office of Defects Investigation, 2016, 13 pages.

R. M. Jungers, A. Kundu, and W. P. M. H. Heemels. Observability and controllability analysis of linear systems subject to data losses. IEEE Transactions on Automatic Control, 2018.

O. Mickelin, N. Ozay, and R. M. Murray. Synthesis of correct-by-construction control protocols for hybrid systems using partial state information. In IEEE American Control Conference, pp. 2305-2311, Jun. 2014.

M. Milanese and A. Vicino. Optimal estimation theory for dynamic systems with set membership uncertainty: an overview. Automatica, 27(6):997-1009, 1991.

K. J. Rutledge, S. Z. Yong, and N. Ozay. Optimization-based design of bounded-error estimators robust to missing data. IFAC-PapersOnLine, 51(16):157-162, 2018. 6th IFAC Conference on Analysis and Design of Hybrid Systems ADHS 2018.

J. Shamma and K.-Y. Tu. Set-valued observers and optimal disturbance rejection. IEEE Trans. on Automatic Control, 44(2):253-264, 1999.

B. Sinopoli, L. Schenato, M. Franceschetti, K. Poolla, M. I. Jordan, and S. S. Sastry. Kalman filtering with intermittent observations. IEEE Trans. on Automatic Control, 49(9):1453-1464, 2004.

J. Skaf and S. P. Boyd. Design of affine controllers via convex optimization. IEEE Trans. on Automatic Control, 55(11):2476-2487, Nov. 2010.

W. Zhang, M. S. Branicky, and S. M. Phillips. Stability of networked control systems. IEEE Control Systems, 21(1):84-99, 2001.

* cited by examiner

PREFIX-BASED BOUNDED-ERROR ESTIMATION WITH INTERMITTENT OBSERVATIONS

STATEMENT REGARDING FEDERALLY SPONSORED RESEARCH

This invention was made with government support under NSF Graduate Research Fellowship Grant Number DGE 1256260. This invention was also made with government support under Early Career Faculty grant NNX16AR65G from NASA's Space Technology Research. The government has certain rights in the invention.

CROSS-REFERENCES TO RELATED APPLICATIONS

Not Applicable,

BACKGROUND OF THE INVENTION

1. Field of the Invention

This invention relates to estimating dynamic state updates in vehicles subject to missing sensor measurements.

2. Description of the Related Art

Control and decision-making loops in many automotive applications may not have access to regularly sampled sensory data. One typical example of intermittent measurements is in networked control systems where sensory data is transmitted over unreliable communication networks, which are subject to packet drops (Refs. 12, 14). Another example is due to sensor glitches that may cause certain sensory readings to be unavailable occasionally, and it is desirable to have control and estimation algorithms that are robust to these temporary failures. Finally, for many autonomous systems where perception algorithms are used to provide information about the positions of external agents to the controlled agent, such position information might be missing temporarily due to classification errors in the perception algorithm or occlusion such as an unexpected flash of light that blinds a camera, or by a gliding leaf that suddenly blocks a LIDAR sensor (Refs. 6, 10).

Therefore, there is a need for control and estimation algorithms robust to missing data.

SUMMARY OF THE INVENTION

The present disclosure provides an improved method of estimating a dynamic state update of a vehicle using a pattern of previous measurements which have missing measurements.

In one aspect, the present disclosure provides a method in a data processing system that includes at least one processor and at least one memory, the at least one memory comprising instructions executed by the at least one processor to implement a prefix-based estimator system. The method includes receiving a plurality of vehicle states at a plurality of time points from at least one sensor coupled to a vehicle, wherein each of the plurality of vehicle states includes at least one parameter information and a discrete state, determining a most recent vehicle state of the plurality of vehicle states has at least one parameter information missing, identifying a prefix comprising a missing data pattern that matches a sequence of discrete states of a subset of time-ordered vehicle states including the most recent vehicle state, wherein the subset of time-ordered vehicle states correspond to the prefix, calculating an estimated updated vehicle state of the vehicle using an optimized prefix-based dynamic estimator based on the prefix and the subset of time-ordered vehicle states, and providing the estimated updated vehicle state to a driving control system of the vehicle.

In the method, the at least one sensor may include a speedometer. The at least one sensor may include a LIDAR sensor. The at least one sensor may include a camera.

In the method, the prefix may belong to a language that includes a plurality of prefixes. The estimator may be optimized to provide a bounded error estimate for all prefixes in the language.

In the method, the estimator may be optimized using a Q-parametrization technique.

In the method, the driving control system may be an adaptive cruise control system.

In the method, the missing data pattern may include six discrete states.

In the method, at least one of the time-ordered vehicle states preceding the most recent vehicle state may have at least one parameter information missing.

In another aspect, the present disclosure provides a driving control system for a vehicle having at least one sensor. The driving control system includes at least one sensor coupled to a vehicle and a controller in electrical communication with the at least one sensor. The controller is configured to execute a program stored in the controller to receive a plurality of vehicle states at a plurality of time points from the at least one sensor coupled to a vehicle, wherein each of the plurality of vehicle states includes at least one parameter information and a discrete state, determine a most recent vehicle state of the plurality of vehicle states has at least one parameter information missing, identify a prefix comprising a missing data pattern that matches a sequence of discrete states of a subset of time-ordered vehicle states including the most recent vehicle state, wherein the subset of time-ordered vehicle states correspond to the prefix, calculate an estimated updated vehicle state of the vehicle using an optimized prefix-based dynamic estimator based on the prefix and the subset of time-ordered vehicle states, and provide the estimated updated vehicle state to a driving control system of the vehicle.

In the system, the at least one sensor can include a speedometer. The at least one sensor can include a LIDAR sensor. The at least one sensor can include a camera.

In the system, the prefix can belong to a language that includes a plurality of prefixes. The estimator can be optimized to provide a bounded error estimate for all prefixes in the language.

In the system, the estimator can be optimized using a Q-parametrization technique.

In the system, the driving control system can be an adaptive cruise control system.

In the system, the missing data pattern can include six discrete states.

In the system, at least one of the time-ordered vehicle states preceding the most recent vehicle state can have at least one parameter information missing.

In another aspect, the present disclosure provides a method of estimating missing data, the method comprising: determining the missing data; determining prefixes of the missing data; determining, based on the prefixes of the missing data, values of the missing data such that are error-bounded estimates are determined.

These and other features, aspects, and advantages of the present invention will become better understood upon consideration of the following detailed description, drawings and appended claims.

DETAILED DESCRIPTION OF THE INVENTION

Introduction

Some driving systems rely on a measured current state such as a speed of the vehicle to calculate dynamics updates and determine a driving maneuver to execute based on the calculated dynamics update(s). When a measured current state is not available, the driving system is not able to function properly. An accurate estimation of the current state of the vehicle can allow the driving system to continue functioning as if the measured current state was available.

When concerning safety-critical applications, in addition to robustness to missing data, it is necessary to have a bound on the state estimation error when using an estimator so that safety of the state can be assessed even during the transient periods. Set-valued or set-membership estimation techniques have been proposed to obtain such non-asymptotic guarantees on the estimation error (Refs. 2, 9, 11). These techniques are also related to filters optimizing $l_\infty$-induced norm (i.e., $l_1$-filters). A related notion is that of equalized performance (Refs. 4, 5), which, roughly speaking, requires the estimation error at the next step to be within a given bound if the previous values of the error satisfy that bound. In our recent work (Ref. 10), we proposed a generalization of this property, namely equalized recovery, that allows for a more relaxed bound on the estimation error within a time interval as long as the error gets back to its original bound at the end of the interval.

In this disclosure, we propose an optimization-based method to synthesize estimators that provide equalized recovery guarantees with intermittent measurements. Different frameworks exist to model intermittent measurements. Earlier works, especially those dealing with communication networks, consider probabilistic models of intermittent measurements (Ref. 12), whereas recent works consider automaton-based (Ref. 7) or language-based (Ref. 10) models to represent feasible missing data patterns. Among these works only Ref. 10 deals with bounded-error estimation. Similar to Ref. 10, we also consider language constraints to represent the missing data patterns. On the other hand, as opposed to the worst-case approach in Ref. 10, where robustness against the worst-case missing data pattern is considered, our proposed estimators adapt their filter gains based on the prefix of the missing data pattern observed thus far; hence, significantly improving achievable recovery levels. The design of these estimators are enabled by Q-parametrization, which is a technique used to recast the optimal control design for affine systems as a convex programming problem (Ref. 13). Although, in general, imposing additional structure on filter/controller gains in Q-parametrization-based design leads to non-convex problems, one of our contributions is to show that the structure imposed by prefix dependency of the filter gains still leads to a convex problem. Therefore, the proposed filters not only provide significantly improved recovery levels, but also can be synthesized efficiently.

Notation and Preliminaries

The sets of real and binary numbers are denoted by R and B, respectively. We denote by $\|\cdot\|$ infinity norms of vectors and matrices. The symbol $\otimes$ represents the Kronecker product, $I_k$ represents the identity matrix of size k, $0_{k \times m}$ represents the k×m zero matrix, $1_k$ denotes a k dimensional vector of ones, and diag($\sigma$) represents a diagonal matrix with the elements of $\sigma$ on the main diagonal. The subscripts are dropped when the dimension of the matrix is clear from the context. For matrices and vectors, the inequalities $\geq$ are always taken element-wise. For a (block) vector v, $(v)^k$ and $v_{i:j}$ denote its $k^{th}$ entry, and its sub-vector consisting of entries from $i^{th}$ to $j^{th}$, respectively.

For a given set $\Sigma$, the symbol $$\overset{*}{\Sigma}$$

denotes the set of all finite-length words and $$\overset{[T]}{\Sigma}$$

denotes the set of all words with length up to T that are formed by elements in $\Sigma$. For a word $$w \in \overset{*}{\Sigma},$$

its length is denoted by $|w|$. For $i \leq |w|$, we use $w^{[1:i]}$ to denote the length i prefix of w. Finally, the set of all non-empty prefixes of w is denoted by Pref(w).

A. Properties of Block Triangular Matrices

Several important properties of block lower triangular matrices will be exploited in this work. To describe them, the following notion is introduced. Intuitively, it is very similar to the leading principal minors of a square matrix, but is applied to non-square block matrices.

Definition 1: The $i^{th}$ leading principal block minor of a l×p block matrix $X \in R^{al \times bp}$ written as $BM_i(X)$, is the l×p block matrix:

$$BM_i(X) = X([1:il], [1:ip])$$

for all $i \in [1, \min(a,b)]$.

Using this definition, several properties of the leading principal block matrix operator $BM_i(\cdot)$ can be shown for lower block triangular matrices, as follows:

Lemma 1: Let $W, X \in \mathbb{R}^{ap \times bq}$, $Y \in \mathbb{R}^{bq \times cr}$ and $Z \in \mathbb{R}^{as \times as}$. The following properties hold:
(1) $BM_i(W+X) = BM_i(W) + BM_i(X)$;
(2) If X and Y are p×q and q×r block lower triangular. Respectively, then $BM_i(XY) = BM_i(X)BM_i(Y)$;
(3) If Z is nonsingular and s×s block lower triangular, then $BM_i(Z^{-1}) = (BM_i(Z))^{-1}$
for all $i \in [1, \min(a,b,c)]$.

Proof: The first property is a trivial consequence of matrix addition, while the second property follows directly from multiplication of two block lower triangular matrices. Finally, the third property can be observed from the identity for partitioned matrix inversion of block lower triangular matrices.

Proposition 1: Let $\overline{C}^{(1)}$ and $\overline{C}^{(2)}$ be p×n block lower triangular matrices that share the same $j^{th}$ leading principal block minor:

$$BM_j(\overline{C}^{(1)}) = BM_j(\overline{C}^{(2)}).$$

Also let $F_{(1)}$, $F^{(2)}$ be n×p block lower triangular matrices and let S be a n×n block lower triangular matrix, all with compatible block sizes. Define $$Q^{(i)} = F^{(i)}(I - C_{(i)}SF_{(i)})^{-1} \forall i \in \{1, 2\} \quad (1)$$

Then, $$BM_j(F^{(1)}) = BM_j(F^{(2)}) \in \mathbb{R}^{jn \times jp}$$

if and only if $$BM_j(Q^{(1)}) = BM_j(Q^{(2)}) \in \mathbb{R}^{jn \times jp}$$

Proof: Let $\overline{C}_0 = BM_j(\overline{C}^{(1)}) = BM_j(\overline{C}^{(2)})$. We prove both the sufficient and necessary directions:

Sufficiency: Suppose that $BM_j(F_{(1)}) = BM_j(F^{(2)})$. Using the fact that $\overline{C}^{(i)}$, S and $F^{(i)}$ are block lower triangular (and hence, $Q^{(i)}$ is also block lower triangular) for $i \in \{1, 2\}$ as well as Lemma 1, we have:

$$BM_j(Q^{(1)}) = BM_j\left[F^{(1)}(I - \overline{C}^{(1)}SF^{(1)})^{-1}\right]$$
$$= BM_j(F^{(1)})\left(BM_j(I) - BM_j(\overline{C}^{(1)})BM_j(S)BM_j(F^{(1)})\right)^{-1}$$
$$= BM_j(F^{(2)})\left(BM_j(I) - BM_j(\overline{C}^{(2)})BM_j(S)BM_j(F^{(2)})\right)^{-1}$$
$$= BM_j\left[F^{(2)}(I - \overline{C}^{(2)}SF^{(2)})^{-1}\right]$$
$$= BM_j(Q^{(2)})$$

Necessity: Suppose that $BM_j(Q^{(1)}) = BM_j(Q^{(2)})$. First, we note the (strictly) block lower triangular properties of $\overline{C}^{(i)}$, S, $Q^{(i)}$ and $F^{(i)}$. It was shown in (Ref. 13] that we can solve for $F^{(i)}$, for $i \in \{1, 2\}$ from (1) as:

$$F^{(i)} = (I + Q^{(i)}\overline{C}^{(i)}S)^{-1}Q^{(i)}.$$

Then, using the fact that $\overline{C}^{(i)}$, S, $Q^{(1)}$ and $F^{(i)}$ are block lower triangular for $i \in \{1, 2\}$ and Lemma 1, we find that:

$$BM_j(F^{(1)}) = BM_j\left[(I + Q^{(1)}\overline{C}^{(1)}S)^{-1}Q^{(1)}\right]$$
$$= \left(BM_j(I) + BM_j(Q^{(1)})BM_j(\overline{C}^{(1)})BM_j(S)\right)^{-1}BM_j(Q^{(1)})$$
$$= \left(BM_j(I) + BM_j(Q^{(2)})BM_j(\overline{C}^{(2)})BM_j(S)\right)^{-1}BM_j(Q^{(2)})$$

-continued
$$= BM_j\left[(I + Q^{(2)}\overline{C}^{(2)}S)^{-1}Q^{(2)}\right]$$
$$= BM_j(F^{(1)})$$

Proposition 2: Consider the following pairs of matrices ($\overline{C}^{(1)}$, $\overline{C}^{(2)}$) and ($F^{(1)}$, $F^{(2)}$) that share the same $j^{th}$ principal leading block minor amongst each pair $$BM_j(Q^{(1)}) = BM_j(Q^{(2)})$$

$$BM_j(\overline{C}^{(1)}) = BM_j(\overline{C}^{(2)})$$

and consider two vectors $u_0^{(1)}$ and $u_0^{(2)}$ and a block lower triangular matrix S. Define:

$$r^{(i)} = (I + Q^{(i)}\overline{C}^{(i)}S)u_0^{(i)} = \forall i \in \{1, 2\}. \quad (2)$$

Then, the vectors $u_0^{(1)}$ and $u_0^{(2)}$ satisfy:

$$(u_0^{(1)})_k = (u_0^{(2)})_k \forall k \in [1, jn]$$

if and only if the first jn entries of the vector $r^{(1)}$ is identical to that of $r^{(2)}$:

$$(r^{(1)})_k = (r^{(2)})_k \forall k \in [1, jn]$$

Proof: The proof is similar to Proposition 1:

$$r^{(1)}_{1:jn} = \left[(I + Q^{(1)}\overline{C}^{(1)}S)u_0^{(1)}\right]_{1:jn}$$
$$= \mathcal{BM}_j(I + Q^{(1)}\overline{C}^{(1)}S)\left[u_0^{(1)}\right]_{1:jn}$$
$$= \left(\mathcal{BM}_j(I) + \mathcal{BM}_j(Q^{(1)})\mathcal{BM}_j(\overline{C}^{(1)})\mathcal{BM}_j(S)\right)\left[u_0^{(1)}\right]_{1:jn}$$
$$= \left(\mathcal{BM}_j(I) + \mathcal{BM}_j(Q^{(2)})\mathcal{BM}_j(\overline{C}^{(2)})\mathcal{BM}_j(S)\right)\left[u_0^{(2)}\right]_{1:jn}$$
$$= \mathcal{BM}_j(I + Q^{(2)}\overline{C}^{(2)}S)\left[u_0^{(2)}\right]_{1:jn}$$
$$= r^{(2)}_{1:jn}$$

where we again applied the fact that $\overline{C}^{(i)}$, S, $Q^{(i)}$, and $F^{(i)}$ are block lower triangular for $i \in \{1, 2\}$ and Lemma 1. Opposite direction is similar.

Problem Setup

In this disclosure, we consider estimation problems for affine systems subject to missing measurements. We use the following two-mode switched system to represent the dynamics and measurement updates:

$$x(t+1) = Ax(t) + Bu(t) + f + w(t), \quad (3)$$

$$y(t) \begin{cases} Cx(t) + v(t), & q(t) = 1 \\ \emptyset, & q(t) = 0 \end{cases}$$

Where A, B, C, f are known system matrices, $x(t) \in X \subseteq \mathbb{R}^n$ is the continuous state, $u(t) \in \mathcal{U} \subseteq \mathbb{R}^m$ is the input, $w(t) \in \mathcal{W} \subseteq \mathbb{R}^n$ is the process noise, $y(t) \in \mathcal{Y} \subseteq \mathbb{R}^p \cup \{\emptyset\}$ is the output measurements of the system, $q(t) \in \mathbb{B}$ is the discrete state/mode of the hybrid system, with $q(t) = 1$ denoting that the measurement vector is available and $q(t) = 0$ corresponding to "missing" data, and $v(t) \in V \subseteq \mathbb{R}^p$ is the measurement noise. The noise terms w(t) and v(t) are unknown but bounded, and their bounds are known (i.e., $\mathcal{W} = \{w \in \mathbb{R}^n | \|w\| \leq \eta_w\}$ and $V = \{v \in \mathbb{R}^p | \|v\| \leq \eta_v\}$)

Remark 1: The assumption that the noise terms w and v in (3) have an identity gain in front of them is just to keep the notation in the proceeding derivations simpler. If a model contains non-identity gain terms on the process or measurement noise (i.e., $\overline{B}_w w(t)$, $\overline{C}_v v(t)$), it is straightforward to incorporate this in the proposed methodology.

We further impose a constraint on the allowable missing data patterns. This constraint is modeled by a fixed-length language $\mathcal{L} \subseteq \mathbb{B}^T$ that specifies the set of allowable mode sequences $\{q(t)\}_{t_0}^{t_0+T-1}$.

Our goal is to design an estimator $$\mathcal{O}: (\mathcal{U} \times \mathcal{Y})^* \to X \qquad (4)$$

that given the input output data so far, generates an estimate of the state. In particular, we are interested in bounded error estimators that satisfy the following equalized recovery condition proposed in (Ref. 10).

Definition 2 (Equalized Recovery): An estimator is said to achieve an equalized recovery level $M_1$ with recovery time T and intermediate level $M_2 \geq M_1$ at time $t_0$ if whenever $\|\xi(t_0)\| \leq M_1$, we must have $\|\xi(t)\| \leq M_2$ for all $t \in [t_0, t_0+T]$ and $\|\xi(t_0+T)\| \leq M_1$.

If we consider the special case of achieving equalized recovery level M with recovery horizon one and intermediate level M, this is equivalent to equalized performance, proposed earlier in the literature (Refs. 5, 8). In other words, an estimator exists that satisfies equalized recovery with intermediate level $M_2$ that is the same as recovery level $M_1$, and $M_2 = M_1$, if and only if that estimator also satisfies equalized performance with level $M_1$. Now we are ready to state the problem of interest.

Problem 1: [Equalized Recovery Estimator Synthesis] Let the initial estimate at time $t_0$ be $\hat{x}(t_0)$ and the initial estimation error be $\xi(t_0) \triangleq x(t_0) - \hat{x}(t_0)$. Given that the dynamics of the system is (3),
the recovery level is $M_1$ i.e., with ($\|\xi(t_0)\| \leq M_1$),
the intermediate level is $M_2 \geq M_1$
the recovery time is T, and
the mode signal q (t), $t \in [t_0, t_0+T-1]$ satisfies a missing data model $\mathcal{L} \subseteq \mathbb{B}^T$ find an estimator $\mathcal{O}: (\mathcal{U} \times \mathcal{Y})^{[T]} \to X$ such that $\|\xi(t)\| \leq M_2$ for all $t \in [t_0, t_0+T]$ and $\|\xi(t_0+T)\| \leq M_1$.

We consider a finite horizon dynamic estimator with the following update rules:

$$\hat{x}(t+1) = A\hat{x}(t) + Bu(t) - u_e(t) + f, \qquad (5)$$

where $u_e(t)$ is an output injection term to be designed. In our earlier work (Ref. 10), for a single missing data pattern (i.e., $|\mathbb{B}| = 1$), we consider the following causal output injection term:

$$u_e(t) = u_0(t) + \sum_{\tau=t_0}^{t} F_{(t,\tau)} y_\xi(\tau), \qquad (6)$$

where $y_\xi(\tau) \triangleq \begin{cases} y(\tau) - C\hat{x}(\tau), & q(\tau) = 1 \\ 0, & q(\tau) = 0 \end{cases}$ and $t_0$ is the initial time of the finite horizon. A necessary and sufficient condition for solving Problem 1 with a singleton language is given for this class of estimators in terms of a convex feasibility problem. In case the problem has a solution, the convex program returns the set of estimator gains $u_0(t)$ and $F_{(t,\tau)}$ for $t \in [t_0, t_0+T]$ and $\tau \in [t_0, t]$. The approach is generalized to missing data patterns represented by $\mathbb{B}'$ with $|\mathbb{B}| > 1$ by considering a worst-case word $\sigma^* \in \mathbb{B}^T$ such that a solution for Problem 1 with $\mathbb{B}^* = \{\sigma^*\}$ is also a solution for the same problem with $\mathbb{B}'$.

We now illustrate the limitations of this approach from Ref. 10 with an example language and propose a more general output injection term. Let $\mathbb{B}' = \{\sigma_1, \sigma_2\}$ with $\sigma_1 = 1011$ and $\sigma_2 = 1101$. The worst-case word for $\mathcal{L}$ is $\sigma^* = 1001$. Obviously, if we can find estimator gains that achieve $M_1$ and $M_2$ when missing equalized recovery with levels both the second and third measurements (i.e., $\mathcal{L}^* = \{\sigma^*\}$), this same estimator achieves the same levels both for $\sigma_1$ and $\sigma_2$. On the other hand, assume there exists a set of estimator gains that achieve equalized recovery with levels $M_1$ and $M_2$ for $\sigma_1$ and another set of gains that achieves the same levels for $\sigma_2$. While this does not imply existence of an estimator for $\sigma^*$ (conservativeness of [Ref. 10]), it does not imply the feasibility of Problem 1 either. To see the latter, observe that at time $t_0$ with $q(t_0) = 1$, we have no way to know if $\sigma_1$ or $\sigma_2$ will be the upcoming pattern. Therefore, the gain pairs "$u_0(t_0)$, $F_{(t_0, t_0)}$" corresponding to $\sigma_1$ and $\sigma_2$ are not the same, we have no way to compute $u_e(t_0)$ in (6) that will guarantee equalized recovery with the desired level. In other words, existence of estimator gains for $\sigma_1$ and $\sigma_2$ separately does not guarantee that there is, a causally implementable filter. In order to reduce conservativeness while preserving causality, in this disclosure we propose prefix-based estimators that use the following output injection term at time t:

$$u_e(q_{t_0:t}) = u_0(t, q_{t_0:t}) + \sum_{\tau=t_0}^{t} F_{(t,\tau,q_{t_0:t})} y_\xi(\tau), \qquad (7)$$

where $y_\xi(\tau)$ is defined as before. Since we know that $q_{t_0:t+T-1} \in \mathcal{L}$ $u_e$ should be defined for all prefixes in $\bigcup_{\sigma \in \mathcal{L}}$ Pref $(\sigma)$. For our example in the previous paragraph, we need filter gains for prefixes in $\{1; 10; 11; 101; 110; 1011; 1101\}$. Our main result is to show that these prefix-based estimators, i.e., the filter gains in (6), to achieve a given equalized recovery specification can be computed efficiently using convex programming.

We call the estimator (5) with output injection mechanism (6), a time-based estimator and the new estimator (5) with (7), a prefix-based estimator. While the time-based estimators use the available (non-missing) output history for feedback, prefix-based estimators use both the output history and the discrete-state history. By its definition, it essentially also performs estimation at the discrete-level (or online model detection) to detect which missing data pattern in $\mathbb{B}$ is active and adapts the filter gains accordingly. Whereas, the time based estimator is agnostic to the missing data pattern and tries to be robust rather than adaptive. Next proposition formally captures the fact that prefix-based estimators are more general than time-based estimators.

Proposition 3: For any time-based estimator for the dynamical system in (3) with missing data pattern given by a fixed-length language $\mathcal{L}$, identical performance can be obtained using a prefix-based estimator.

Proof: Let the output injection term for the time-based estimator be $$u_e(t) = \overline{u}_0(t) + \Sigma_{\tau=t_0}^{t} \overline{F}_{(t,\tau)} y_\xi(\tau) \qquad (8)$$

Define the filter gains of the prefix based estimator's output injection term in (7) as $u_0(t, \lambda) = \overline{u}_0(t)$, $F_{(t,\tau,\lambda)} = \overline{F}_{(t,\tau)}$ for all $t \in [t_0, t_0+T]$, $\tau \in [t_0, t]$ and for all $\lambda \in \bigcup_{\sigma \in \mathcal{L}}$ Pref $(\sigma)$. Then the two estimators are equivalent.

Synthesis of Prefix-Based Estimators

In this section, we discuss how to synthesize a prefix-based estimator using robust linear programming and present a necessary and sufficient condition for the existence of an observer that uses prefix-based feedback of the form in (7) and solves Problem 1. Our main result is summarized with the following theorem.

Theorem 1:

The feasibility of a prefix-based finite horizon affine estimator that solves Problem 1 is equivalent to the feasibility of the following optimization problem:

Find $(Q^{(1)}, r^{(1)}), \ldots, (Q^{(|\mathcal{L}|)}, r^{(|\mathcal{L}|)})$ subject to $\forall i \in [1, |\mathcal{L}|]$, $Q^{(i)}$ is m-by-n block lower triangular $$\forall \, (\|w\| \leq \eta_w, \|v\| \leq \eta_v, \|\xi(t_0)\| \leq M_1, \quad (9)$$

$$\|\xi^{(i)}\| \leq M_2 \text{ and } \|[0_{n \times nT} \; I_n]\xi^{(i)}\| \leq M_1,$$

$$\forall \, i, j \in [1, |\mathcal{L}|], \sigma_i, \sigma_j \in \mathcal{L}$$

$$(\lambda \in Pref(\sigma_i) \wedge \lambda \in Pref(\sigma_j)) \rightarrow$$

$$\left[ \left( \mathcal{BM}_{|\lambda|}(Q^{(i)}) = \mathcal{BM}_{|\lambda|}(Q^{(j)}) \right) \wedge \left( (r^{(i)})_{1:|\lambda|m} = (r^{(j)})_{1:|\lambda|m} \right) \right]$$

where $$\overline{C}^{(i)} = [\text{diag}(\sigma_i) \otimes C \; 0_{|\lambda|T \times n}], N^{(i)} = \text{diag}(\sigma_i) \otimes I,$$

$$\xi^{(i)} = \left( S + S Q^{(i)} \overline{C}^{(i)} S \right) w + S Q^{(i)} N^{(i)} v + \left( I + S Q^{(i)} \overline{C}^{(i)} \right) J \xi^{(i)}(t_0) + S r^{(i)},$$

$$J = \begin{bmatrix} I_n \\ A \\ \vdots \\ A^{T-1} \\ A^T \end{bmatrix}, S = \begin{bmatrix} 0 & 0 & 0 & \cdots & 0 \\ I_n & 0 & 0 & \cdots & 0 \\ A & I_n & 0 & \cdots & 0 \\ A^2 & A & I_n & \ddots & \vdots \\ \vdots & \vdots & & \ddots & 0 \\ A^{T-1} & A^{T-2} & A^{T-3} & \cdots & I_n \end{bmatrix}$$

Moreover, if (9) is feasible and we define $$F^{(i)} = (I + Q^{(i)} \overline{C}^{(i)} S)^{-1} Q^{(i)}, \quad (10)$$

$$u_0^{(i)} = (I + Q^{(i)} \overline{C}^{(i)} S)^{-1} r^{(i)}, \quad (11)$$

then, this implies that 1) each F (i) is block lower triangular;
2) for all $\lambda \in Pref(\sigma_i) \cap Pref(\sigma_j)$, we have $\mathcal{BM}_{\lambda|}(F^{(i)}) = \mathcal{BM}_{\lambda|}(F^{(j)})$ and $(u_0^{(i)})_k = (u_0^{(j)})_k$ for all $k \in [1:|\lambda|n]$;
3) a prefix-based estimator solving Problem 1 is defined by $$u_e(\lambda) = u_0(t, \lambda) + \Sigma_{\tau = t_0}^{t} F_{(t, \tau, \lambda)} y_\xi(\tau), \quad (12)$$

where $\lambda \in \bigcup_{\sigma_i \in \mathcal{L}} Pref(\sigma_i)$, $t = t_0 + |\lambda| - 1$, $u_0(t, \lambda) = (u_0^{(i)})_{(|\lambda|-1)n+1:|\lambda|n}$ and $F_{(t, \tau, \lambda)}$ is the $(|\lambda|, \tau - t_0 + 1)$ block-entry of the $F^{(i)}$ block matrix for some i such that $\lambda \in Pref(\sigma_i)$.

Proof: If $\mathcal{L} = 1$, the feasibility problem (9) reduces to that in (Ref. 10) (as the prefix constraints at the end of (9) become void), and its necessity and sufficiency follows from the Theorem 3 therein, which adapts the Q-parametrization arguments in Ref. 13 from control to estimation. To generalize this to $|\mathcal{L}| > 1$ case, the main idea is to consider different output injection strategies, one for each word in $\mathcal{L}$, and to constrain the estimator gains for each of these strategies such that the gains are the same for words that cannot be differentiated/distinguished from each other based on observations up to the current time. In other words, if the prefixes of multiple words are identical to observed sequence of q(t) up to time t, then the estimator gains must be constrained to be the same because there is no way to know which word is currently being used and thus which estimator gain to choose (without violating causality). The prefix constraints at the end of (9) precisely achieves this.

Formally, the constraints for each individual word $\sigma_i \in \mathcal{L}$ in (9) can be simply written as copies of the constraints in Ref. 10. In addition, we require that if multiple words share the same prefix length j, the estimator gains $\mathcal{BM}_j(F)$ and $(u_0)_{0:jn}$ for these words are constrained be the same. Thus, the crux of the proof is to show that these additional constraints are preserved with Q-parametrization that performs a nonlinear change of variables between the filter gains $F^{(i)}$ and $u_0^{(i)}$, and the matrices $Q^{(i)}$ and $r^{(i)}$, given by (10) and (11), to arrive at the equivalent convex program in (9). Since these nonlinear relationships preserve block lower triangular structure (see Ref. 13), $Q^{(i)}$ being block lower triangular is equivalent to $F_{(i)}$ being block lower triangular, which is needed for causality with respect to the continuous inputs and outputs. Moreover, with the nonlinear change of variables between F(L) and $Q^{(i)}$, as well as $u_0^{(i)}$ and $r^{(i)}$ that is precisely the relationship given in (10) and (11) for each $i \in [1, \mathcal{L}]$, by Propositions 1 and 2, we can conclude that the constraints on $\mathcal{BM}_j(F^{(i)})$ and $(u_0^{(i)})_{0:jn}$ are equivalent to constraints on $\mathcal{BM}_j(Q^{(i)})$ and $(r^{(i)})_{0:jn}$, which is required for causality with respect to the discrete mode observations. Finally, the structure of the final estimator (12) simply follows from the way the estimation error history is represented in matrix form in terms of the filter gains and system equations.

Remark 2: Since the feasibility problem in (9) contains semi-infinite constraints due to the "for all" quantifier on the uncertain terms, the problem is not readily solvable. However, as in Ref. 10, techniques from robust optimization (Refs. 1, 3) can be applied to obtain a linear programming (LP) problem with only finitely many linear constraints (detailed optimization problem is omitted for brevity).

Implementation of the Estimator

Assuming that the optimization problem above is feasible, there are multiple scenarios in which this prefix-based estimator can be applied. First, if the estimation problem under consideration is one that is finite horizon, the estimators apply directly. Second, if the missing data pattern repeats itself with a period of T time-step, then, the same estimator can similarly be used with period T since the estimator guarantees that the estimation error bound always recovers at the end of the period to the equalized recovery level $M_1$. Moreover, as in Ref. 10, the prefix-based estimators can be used in conjunction with a filter that guarantees equalized performance. In particular, if we consider languages $\mathcal{L}$ with words that start with a q(t)=0, then we can switch from the equalized performance estimator to equalized recovery estimator whenever a missing measurement occurs and revert back to the equalized performance estimator after the recovery time T.

It is easy to extend the algorithm to any finite-length language $\mathcal{L}$ (as opposed to fixed-length). This just requires defining $\xi^{(i)}$ in the optimization problem (9) to of length $|\sigma_i|$ and $M_1$ bound is enforced at time $|\sigma_i|$ instead of at time T. Furthermore, for a given language $\mathcal{L}$, we can find the minimum time T, which can be longer than the longest word in $\mathcal{L}$ assuming no missing measurements will occur in the extension, that is required for equalized recovery when using the proposed prefix-based optimization formulation. This analysis is helpful for understanding how much time is required for recovery with different types of missing data patterns, which in turn is useful for designing controllers in a compositional manner.

EXAMPLES

The following Examples are provided to demonstrate and further illustrate certain embodiments and aspects of the present invention and are not to be construed as limiting the scope of the invention.

Example 1

In this Example, we demonstrate the superiority of the proposed prefix-based estimator on an automotive problem that was considered in previous works. This motivating example shows that the smallest level of estimation error that we can guarantee using these methods is drastically improved for a realistic scenario when using the prefix-based estimator instead of a time-based one.

Adaptive Cruise Control

An adaptive cruise controller (ACC) is a driver assistance system that aims to maintain a safe headway (the distance between an ego vehicle and the lead vehicle) in the existence of a lead vehicle and, if possible, drive at a set speed during operation. Let the acceleration of the lead car in the ACC system be an uncontrolled disturbance and let the inputs that the controller manipulates be force inputs to the ego vehicle. This can be written in the affine, discrete-time form:

$$\begin{cases} x(t+1) = A_d x(t) + B_d u(t) + f_d + E_d w(t) \\ y(t) = Cx(t) + v(t) \end{cases}$$

where the state $x(t)=[v_e, h(t), v_L(t)]^T$ consists of the speed $v_e$ of the ego vehicle, headway $h$, and speed $v_L$ of the lead vehicle. The system matrices $(A_d, B_d, f_d, E_d)$ are:

$$A_D = \begin{bmatrix} e^{-\kappa T_s} & 0 & 0 \\ \dfrac{e^{-\kappa T_s}-1}{\kappa} & 1 & T_s \\ 0 & 0 & 1 \end{bmatrix},$$

$$B_d = \frac{1}{\bar{k}_1^2}\begin{bmatrix} (1-e^{-\kappa T_s})\bar{k}_1 \\ m(1-e^{-\kappa T_s}) - \bar{k}_1 T_s \\ 0 \end{bmatrix},$$

$$C = \begin{bmatrix} 1 & 0 & 0 \\ 0 & 1 & 0 \end{bmatrix},$$

$$E_d = \begin{bmatrix} 0 \\ \dfrac{T_s^2}{2} \\ T_s \end{bmatrix},$$

$$f_d = \begin{bmatrix} -\dfrac{\bar{k}_0}{\bar{k}_1}(1-e^{-\kappa T}) \\ -\dfrac{\bar{k}_0}{\bar{k}_1^2}(m(1-e^{-\kappa T}) - \bar{k}_1 T) \\ 0 \end{bmatrix},$$

where the constant m is the mass of the vehicle, the constants $\bar{k}_0$ and $\bar{k}_1$ are coefficients related to friction and drag (with $\kappa \triangleq \bar{k}_1/m$), and $T_s$ is the sampling time. The values of these parameters are given in Table 1, shown below.

TABLE 1

| Parameter | m | $\bar{k}_0$ | $\bar{k}_1$ | $T_s$ | $\eta_w$ | $\eta_v$ |
|---|---|---|---|---|---|---|
| Value | 1370 kg | 7.58N | 9.9407 Ns/m | 0.5 s | 0.1 | 0.05 |

For this problem, a reasonable assumption on the lead car (or another driver on the road) is that they limit their acceleration to a certain range for their own comfort or safety among other things. Another reasonable assumption is that our sensors have documented or known quantities such as sensitivity and discretization error (typically detailed in a component's data sheet). Assume that the maximum magnitude of acceleration that the lead car uses is $$0.1\frac{m}{s^2}(\eta_w = 0.1)$$

and that the maximum sensor error (consider a speedometer rated to have an upper bound of 0.01 m/s of error during operation and a radar rated with 50 cm of error) is 0.05 ($\eta_v=0.05$).

Figure 1:
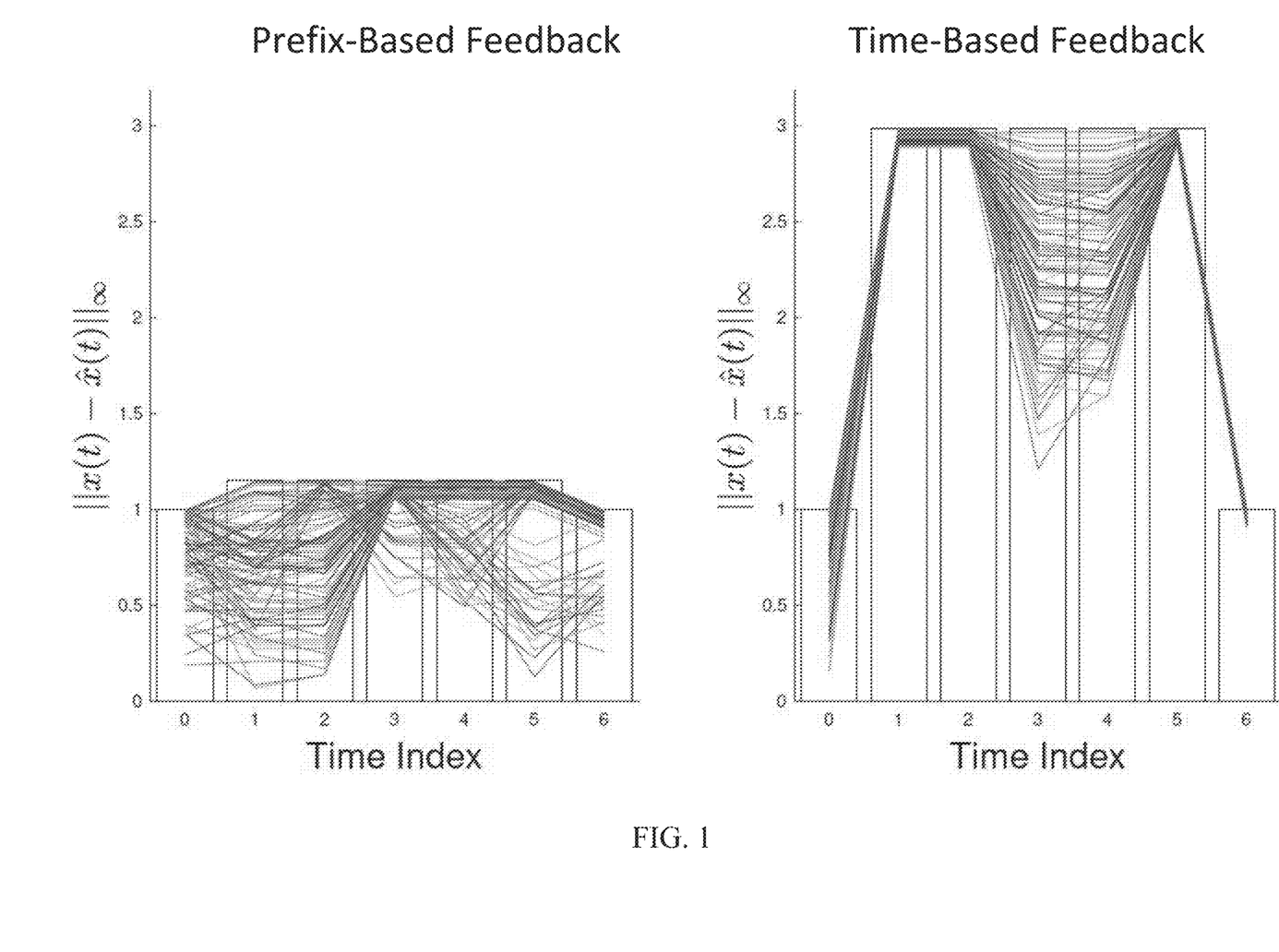
FIG. 1 shows estimation error trajectories of prefix-based feedback laws versus time-based feedback laws. The language $L_1$ is provided for the time-based and prefix based synthesis problems. The optimal $M_2$ that the prefix-based feedback can guarantee is $M_2=1{:}1498$ while the optimal $M_2$ that the time-based feedback can provide is $M_2=2{:}9864$.

The set of feasible missing data patterns that we consider for this problem is $\mathcal{L}_1=\{101111, 110111, 111011, 111101\}$. This may be written in plain English as an 'only 1 piece of data can be missing in a given time window' constraint and would be translated, according to the worst case language approach, to a constraint $\mathcal{L}_1^*=\{100001\}$. For a given set of parameters, or guarantees that the system would like to satisfy, it is obviously harder to guarantee for $\mathcal{L}_1^*$ than any word in $\mathcal{L}_1$ and we would like the optimal $M_2$, value that we find to reflect that, The two approaches presented can be used to find the optimal guarantee for $M_2$ through a straight forward convex optimization problem and an optimal $M_1$ through line search. One natural question about the two methods that we can ask is which provides "better," in this case meaning smaller, bounds on the estimation error. The intuitive answer is that it is the estimator with the prefix-based feedback law and we illustrate this with FIG. 1. The optimal $M_2$ that can be guaranteed for the language $\mathcal{L}_1$ is $M_2^*=1.1490$ when using a prefix-based observer, nearly a third of what can be done with the time-based observer (recall that that number was $M_2^*=2.9864$). The two synthesis problems were completed using YALMIP with the Gurobi solver on an Mac with 3.4 GHz Intel Core i5 processor. The prefix-based problem was solved in 0.11 s (773 iterations) while the time-based problem was solved in 0.05 s (122 iterations). The designs that each optimization created were then applied to 100 sets of random disturbance trajectories and initial conditions (w, v, ξ(0)) that satisfied the assumptions of the problem and the resulting estimation error trajectories are shown to lie within the domain of the bars (guarantees) in FIG. 1.

Conclusions

In this disclosure, we presented a method for synthesizing bounded-error estimators for affine systems that provide equalized recovery guarantees even in the presence of missing data, where the missing data patterns are constrained by a finite-length language. Our proposed optimal estimator leveraged Q-parametrization as well as some additional structure in our problem to provide an estimate of the continuous-state while implicitly estimating the specific missing data pattern (i.e., mode sequence), within the given language, based on observed history of missing data pattern so far. Using numerical examples, we demonstrated that this approach significantly improves the achievable estimation bounds compared to our earlier work that did not implicitly estimate the mode sequence.

We contemplate work that includes correct-by-construction control synthesis with output feedback for safety applications, where state estimators satisfying equalized recovery are implemented to convert the control synthesis problem into one with state feedback subject to additional bounded disturbance/noise due to the estimation errors. We also contemplate extending the framework to detect and handle outliers and/or corrupted measurements.

Example 2

Figure 2:
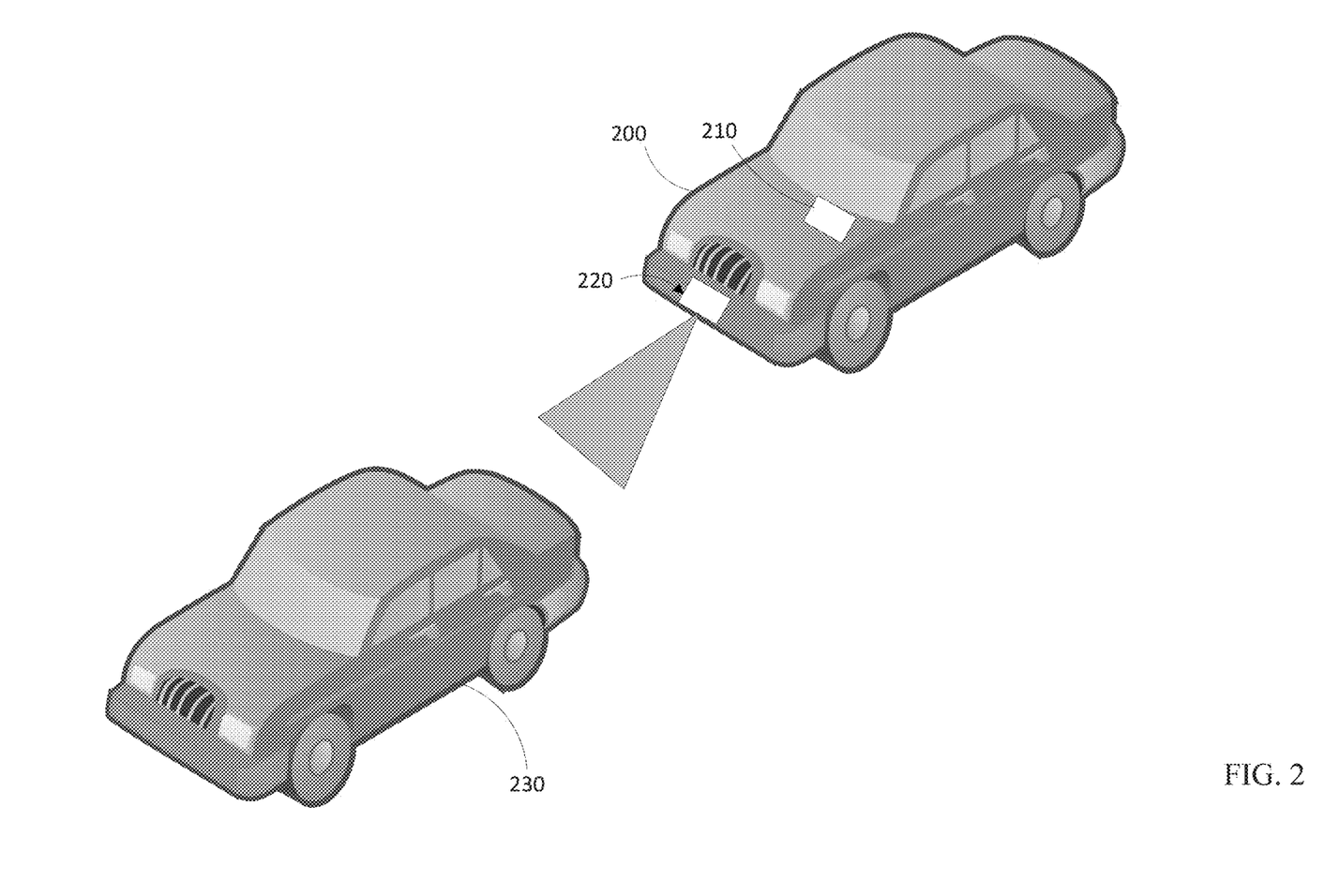
FIG. 2 shows an example vehicle coupled to various sensor types in order to implement a driving control system.

Referring now to FIG. 2, a vehicle 200 can be coupled to a plurality of sensors in order to implement a semi-autonomous driving system, an autonomous driving system, and/or a vehicle safety system. A first sensor 210 can be a sensor configured to measure an operating parameter of the vehicle 200, such as a speedometer configured to measure a speed of the vehicle, a temperature sensor configured to measure a temperature of the engine, oil, motor, battery, brakes, interior or exterior of the vehicle 200, or other component of the vehicle 200, a rotation sensor configured to measure rotations per minute of an engine or motor, a steering position of the steering wheel of the vehicle 200, or other rotary position of a component of the vehicle 200, a global positioning system (GPS) sensor able to sense a distance to a stop sign or intersection, or any other sensor able to measure another operating parameter of the vehicle 200.

A second sensor 220 can be a camera, LiDAR sensor, or other sensor able to sense a position of an exterior element of the vehicle 200. For example, the second sensor 220 can be a MAR sensor configured to measure the headway of a second vehicle 230 or a static object such as a parked vehicle, a camera configured to sense a center line of a lane, or other position of an exterior element. The second sensor 220 can be used to derive dynamics parameters such as velocities, orientations, or yaw rate, of an object using methods known in the art. While shown mounted on the front end of the vehicle 200, the second sensor can be mounted at any position on the vehicle 200 including but not limited to the rear end, a side, a corner, or any other position to allow the second sensor 220 to sense a position of an exterior element of the vehicle 200.

The vehicle 200 can have any number or combination of sensors, i.e., one or more first sensors 210 and/or one or more second sensors 220. The sensors 210 and/or 220 can be used in isolation or combination to implement safety control systems including but not limited to adaptive cruise control, lane departure systems, blind spot monitoring systems, collision avoidance systems, or other systems that utilize the dynamics of the vehicle 200 or second vehicle 230. The first sensor 210 or second sensor 220 can be coupled to a controller or data processing system with a memory and a processor.

Figure 3:
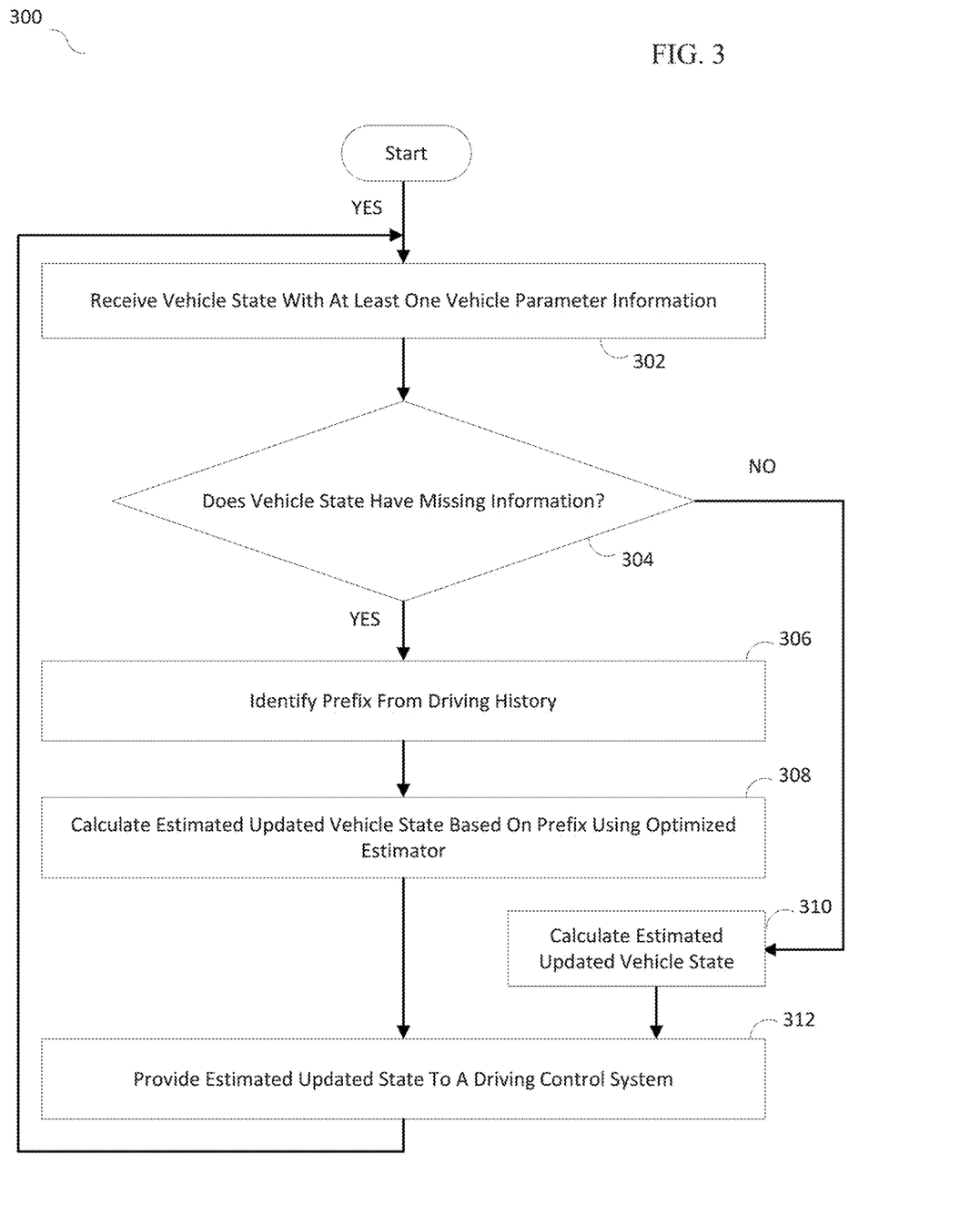
FIG. 3 shows an example of a process for providing estimated updates for a dynamic component of an affine system when a continuous state of the affine system has missing data.

Referring to FIG. 2 as well as FIG. 3, an example of a process 300 for providing estimated updates for a dynamic component of an affine system when the continuous state (i.e., current state) of the affine system has missing data is shown. The process 300 can implement a prefix-based dynamic estimator which includes equation (5) with equation (7) used as the output injection term. The affine system can be similar to equation (3). The affine system can be used to provide dynamics updates to a driving control system such as semi-autonomous driving system, autonomous driving system, and/or vehicle safety system, such as the adaptive cruise control system detailed in the example above. The affine system matrices components such as B can be set according to parameters of the car such as mass m, sensor error tolerances such as $\eta_v$, limits of change in other objects monitored by the sensor such as $\eta_w$, or other parameters relevant to the dynamics system.

At 302, the process 300 can receive a vehicle state from at least one sensor coupled to a vehicle. The at least one sensor can include any number or combination of sensors such as one or more first sensors 210 and/or one or more second sensors 220. The vehicle state includes at least one vehicle parameter information used in the affine system. Parameter information can be directly derived from a sensor, i.e. a speedometer providing a speed of the vehicle, or calculated, i.e. a speed of another vehicle calculated using a LiDAR sensor. The vehicle state is received regardless of if any parameter information is received from the sensors, and each vehicle state has a time value. The parameter information can have a null value if not received, as will be explained below. The parameter information can be the x(t) component of equation (3). The vehicle state is added to a vehicle driving history that is ordered by time value. The time value can be determined by the process 300, one or more of the sensors 210, 220, or by a separate clock. The vehicle state also has a discrete state to record if information is missing, which will be explained below. The process 300 can then proceed to 304.

At 304, the process 300 can determine if the most recent vehicle state in the driving history has at least one missing parameter information. Parameter information may be determined to be missing due to a packet drop, as described above, or other communications failure that causes the parameter information to not be received from the sensor by the process, i.e. the parameter information has a null value. In other instances, the parameter information may be determined to be missing if the parameter information indicates the sensor has been occluded, such as if a leaf has blocked a LiDAR sensor, and the parameter information is outside of a predetermined tolerance range or significantly different from a previous value. The vehicle state has a discrete state to record whether or not the vehicle state has missing parameter information. The discrete state is assigned a "0" value if the parameter information is determined to be missing, and is assigned a "1" value otherwise. If the vehicle state does not have at least one missing parameter information, the process 300 can proceed to 310. If the vehicle state has at least one missing parameter information, the process 300 can proceed to 306, At 306, the process 300 can identify a prefix from the driving history. A language $\mathbb{B}$ of the prefix-based dynamic estimator includes a number of words; each of these words contain prefixes that are finite sequences of discrete states and such prefixes will match the most recent vehicle states in the driving history because $\mathbb{B}$ describes all possible sequences of discrete states. $\mathbb{B}$ may be determined by the characteristics of sensors (e.g. LiDAR's false detection rates, etc.) or characteristics of the environment (e.g. in rain, the vehicles camera may provide blurry images for only a short amount of time before the windshield wiper wipes it clean) or some other specification. Thus, the most recent vehicle states always correspond to at least one prefix. The process 300 can then proceed to 308.

At 308, the process 300 can calculate an estimated updated vehicle state based on the prefix as well as the vehicle states of the driving history that correspond to the prefix using the prefix-based dynamic estimator. The estimated updated vehicle state can be the $\hat{x}(t+1)$ component of equation (5). The $\hat{x}(t+1)$ component can be calculated using the prefix and vehicle states of the prefix as detailed in equation (7). The prefix-based dynamic estimator is previously optimized to provide a bounded error estimate for all prefixes in the language $\mathcal{L}$. The prefix-based dynamic estimator can be optimized previously using Q-Parameterization as in equation (9). The bounded error estimate can be guaranteed to have equalized recovery level $M_1$ and intermediate level $M_2$ for measurements before the recovery time T of the prefix-based dynamic estimator has passed. To prevent a long recovery time, in some embodiments, the language $\mathcal{L}$ can be composed of words of the same length, and contain all permutations of discrete state patterns for those words. In other words, the prefix identified is an entire word, and the process has recovered. In some embodiments, the process 300 may wait until sufficient measurements have been taken to support all words in the language $\mathcal{L}$ and improve recovery times. It is contemplated that the prefix-based dynamic estimator could be optimized using another convex equation other than equation (9). The prefix-based dynamic estimator is bounded as to achieve equalized recovery as laid out in Definition 2 above. The process 300 can then proceed to 312.

At 310, the process 300 can calculate an estimated updated vehicle state using the most recent vehicle state. In some embodiments, the estimated updated vehicle state can be calculated using an equalized performance estimator. The equalized performance estimator can be substantially the same as prefix based estimator, except that the equalized performance estimator is optimized using $M_1$ in place of $M_2$ in equation (9), as described above. In some embodiments, the equalized performance estimator has a language with a single, word with no missing parameter information. In other words, the word has a "1" for all discrete states. The equalized performance estimator can guarantee the recovery level $M_1$ even for certain derived parameters that may rely on missing data of previous points. For example, acceleration can be derived from measured distances of a sensor in multiple vehicle states, some of which may have missing information. Regardless of if one of the previous vehicle states has missing information, the acceleration derived can be guaranteed to be at or below $M_1$ in the current estimated updated vehicle state. In some embodiments, the estimated updated vehicle state can be calculated using a dynamic update formula such as the $x(t+1)$ component of equation (5). The process 300 can then proceed to 312.

At 312, the process 300 can provide the estimated updated vehicle state to the driving control system. The driving control system may be implemented within a memory and processor or controller that implements the process 300, or another memory and processor or controller such as an electronic control unit configured to implement the driving control system in the vehicle. The driving control system can then determine whether or not to perform a vehicle maneuver based on the estimated updated vehicle state. The process 300 can then proceed to 302. It is also contemplated that the process could end after 312 has been executed.

Figure 4:
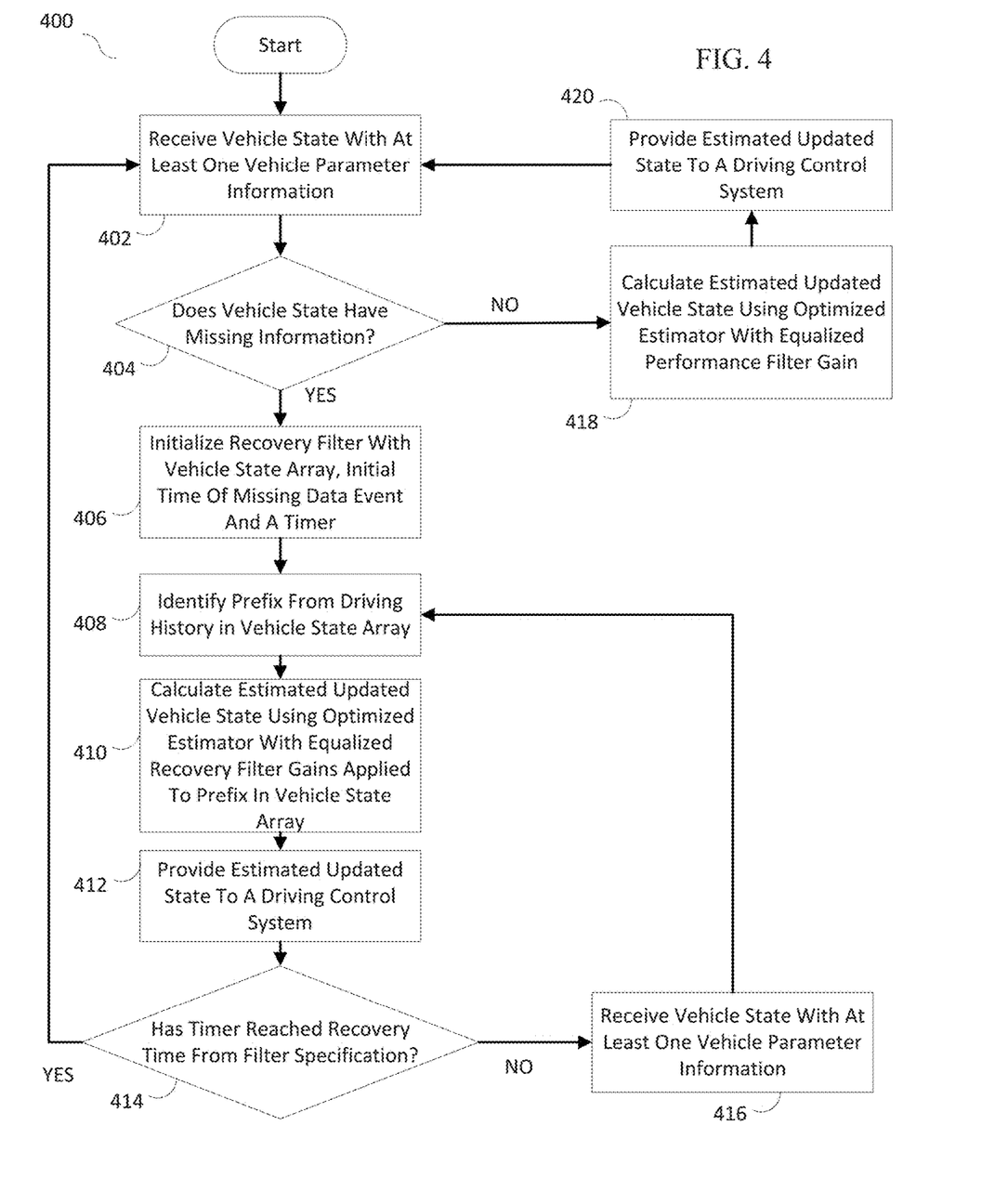
FIG. 4 shows another example of a process for providing estimated updates for a dynamic component of an affine system when a continuous state of the affine system has missing data.

Referring to FIG. 2 as well as FIG. 4, another example of a process 400 for providing estimated updates for a dynamic component of an affine system when the continuous state (i.e., current state) of the affine system has missing data is shown. The process 400 can implement a prefix-based dynamic estimator which includes equation (5) with equation (7) used as the output injection term. The affine system can be similar to equation (3). The affine system can be used to provide dynamics updates to a driving control system such as semi-autonomous driving system, autonomous driving system, and/or vehicle safety system, such as the adaptive cruise control system detailed in the example above. The affine system matrices components such as B can be set according to parameters of the car such as mass m, sensor error tolerances such as $\eta_v$, limits of change in other objects monitored by the sensor such as $\eta_w$, or other parameters relevant to the dynamics system.

At 402, the process 400 can receive a vehicle state from at least one sensor coupled to a vehicle. The at least one sensor can include any number or combination of sensors such as one or more first sensors 210 and/or one or more second sensors 220. The vehicle state includes at least one vehicle parameter information used in the affine system. Parameter information can be directly derived from a sensor, i.e. a speedometer providing a speed of the vehicle, or calculated, i.e. a speed of another vehicle calculated using a LiDAR sensor. The vehicle state is received regardless of if any parameter information is received from the sensors. The parameter information can have a null value if not received, as will be explained below. The parameter information can be the x(t) component of equation (3). The vehicle state has a time value, and is added to a vehicle driving history that is ordered by time value. The time value can be determined by the process 400, one or more of the sensors 210, 220, or by a separate clock. The vehicle state also has a discrete state to record if information is missing, which will be explained below. The process 400 can then proceed to 404.

At 404, the process 400 can determine if the most recent vehicle state in the driving history has at least one missing parameter information. Parameter information may be determined to be missing due to a packet drop, as described above, or other communications failure that causes the parameter information to not be received from the sensor by the process, i.e. the parameter information has a null value. In other instances, the parameter information may be determined to be missing if the parameter information indicates the sensor has been occluded, such as if a leaf has blocked a LIDAR sensor, and the parameter information is outside of a predetermined tolerance range or significantly different from a previous value. The vehicle state has a discrete state to record whether or not the vehicle state has missing parameter information. The discrete state is assigned a "0" value if the parameter information is determined to be missing, and is assigned a "1" value otherwise. The time value of the most recent vehicle state will be used as an initial time in step 406, as will be explained below. If the vehicle state does not have at least one missing parameter information, the process 400 can proceed to 418. If the vehicle state has at least one missing parameter information, the process 400 can proceed to 406.

At 406, the process 400 can initialize a recovery filter with a vehicle state array of one or more time ordered sequential vehicle states, initial time of a missing data event, and a timer. The first vehicle state in the array is the most recent vehicle state of 404. The vehicle state array can hold a predetermined number of vehicle states such as the recovery time T of the prefix-based estimator, which can correspond to the length of words in a language $\mathcal{L}$ of the prefix-based dynamic estimator. The initial time is the time value of the most recent vehicle state of 404 with missing data. The timer is given a value of 0.

At 408, the process 400 can identify a prefix from the driving history in memory. More specifically, the prefix is the time ordered sequential vehicle states in the vehicle state array. The language $\mathcal{L}$ of the prefix-based dynamic estimator includes one or more words; the prefixes of these words are finite sequences of discrete states that correspond to the most recent vehicle states in the driving history. The language may consist of words that start with a discrete state of "0", indicating the first vehicle state has missing information. The most recent vehicle states correspond to the prefix. Additionally, the process 400 increments the timer. The process 400 can then proceed to 410.

At 410, the process 400 can calculate an estimated an updated vehicle state using an optimized estimator with equalized recovery filter gains applied to the prefix in the vehicle state array. The estimated updated vehicle state can be the $\hat{x}(t+1)$ component of equation (5). The $\hat{x}(t+1)$ component can be calculated using the prefix and vehicle states of the prefix to calculate $u_e(t)$ or $u_e(q_{t_0:t})$ as detailed in equation (7), which contains the equalized recovery filter gains. The prefix-based dynamic estimator is previously optimized to provide a bounded error estimate for all prefixes in the language $\mathcal{L}$. The prefix-based dynamic estimator can be optimized previously, i.e. before usage in process 400, using Q-Parameterization as in equation (9). The bounded error estimate can be guaranteed to have equalized recovery level $M_1$ and intermediate level $M_2$ for measurements before the recovery time T of the prefix-based dynamic estimator has passed. It is contemplated that the prefix-based dynamic estimator could be optimized using another convex equation other than equation (9). The prefix-based dynamic estimator is bounded as to achieve equalized recovery as laid out in Definition 2 above. The process 400 can then proceed to 412.

At 412, the process 400 can provide the estimated updated vehicle state to the driving control system. The driving control system may be implemented within a memory and processor or controller that implements the process 400, or another memory and processor or controller such as an electronic control unit configured to implement the driving control system in the vehicle. The driving control system can then determine whether or not to perform a vehicle maneuver based on the estimated updated vehicle state. The process 400 can then proceed to 414. It is also contemplated that the process could end after 412 has been executed.

At 414, the process 400 can determine if the timer has reached the recovery time T specified by the filter or prefix-based dynamic estimator. When the timer reaches recovery time T, the prefix-based dynamic estimator has achieved equalized recovery level $M_1$, and the process 400 can revert back to using an equalized performance estimator. If the timer has not reached the recovery time T, the process 400 can proceed to 416. If the recovery time T has reached recovery time, the process 400 can proceed to 402.

At 416, the process 400 can receive a vehicle state from the at least one sensor coupled to the vehicle. 416 may be substantially the same as 402. The process 400 can then proceed to 408.

At 418, the process 400 can calculate an estimated updated vehicle state using the most recent vehicle state. In some embodiments, the estimated updated vehicle state can be calculated using an equalized performance estimator. The equalized performance estimator can be substantially the same as prefix based estimator, except that the equalized performance estimator is optimized using $M_1$ in place of $M_2$ in equation (9), as described above. In some embodiments, the equalized performance estimator has a language with a single word with no missing parameter information. In other words, the word has a "1" for all discrete states. The equalized performance estimator can guarantee the recovery level $M_i$ even for certain derived parameters that may rely on missing data of previous points. For example, acceleration can be derived from measured distances of a sensor in multiple vehicle states, some of which may have missing information. Regardless of if one of the previous vehicle states has missing information, the acceleration derived can be guaranteed to be at or below $M_1$ in the current estimated updated vehicle state. The process 400 can then proceed to 420.

At 420, the process 400 can provide the estimated updated vehicle state to the driving control system. 420 may be substantially the same as 412. The process 400 can then proceed to 402.

Thus, the present invention provides data estimation guarantees in situations where data may be temporarily unavailable. A method of the invention is suitable for synthesizing bounded-error estimators for affine systems. In one embodiment, equalized recovery may be when bounds on the estimation error may be relaxed for a given time interval. In one embodiment, in equalized recovery, the estimation error may be required to return back to its original bound by the end of the given time interval. In one embodiment, the synthesis of the bounded-error estimators may include adapting filters based on the prefix of the unavailable data, improving the equalized recovery. In one embodiment, design of the bounded-error estimators may be enabled by Q-parameterization to show that the prefix-based adaptation to the filters lead to convex problems and estimators may be synthesized efficiently. In one embodiment, the optimal estimators may provide an estimate of the continuous-state. In one embodiment, the optimal estimators may simultaneously estimate a specific unavailable data pattern based on observation of a history of unavailable data pattern.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] A. Ben-Tal, L. El Ghaoui, and A. Nemirovski. Robust optimization. Princeton University Press, 2009.
[2] D. Bertsekas and I. Rhodes. Recursive state estimation for a set-membership description of uncertainty. IEEE Transactions on Automatic Control, 16(2):117-128, 1971.
[3] D. Bertsimas, D. Brown, and C. Caramanis. Theory and applications of robust optimization. SIAM review, 53(3): 464-501, 2011.
[4] F. Blanchini and M. Sznaier. A convex optimization approach to fixed-order controller design for disturbance rejection in siso systems. IEEE Transactions on Automatic Control, 45(4):784-789, April 2000.
[5] F. Blanchini and M. Sznaier. A convex optimization approach to synthesizing bounded complexity R filters. IEEE Trans. on Automatic Control, 57(1):216-221, 2012.
[6] K. Habib, ODI Resume Report on Investigation PE 16-007 concerning Tesla automatic vehicle control systems. Technical report, NHTSA Office of Defects Investigation, 2016.

[7] R. M. Jungers, A. Kundu, and W. P. M. H. Heemels. Observability and controllability analysis of linear systems subject to data losses. IEEE Transactions on Automatic Control, 2018.

[8] O. Mickelin, N. Ozay, and R. M. Murray. Synthesis of correct-by-construction control protocols for hybrid systems using partial state information. In IEEE American Control Conference, pages 2305-2311, June 2014,

[9] M. Milanese and A. Vicino. Optimal estimation theory for dynamic systems with set membership uncertainty: an overview. Automatica, 27(6):997-1009, 1991.

[10] K. J. Rutledge, S. Z. Yong, and N. Ozay. Optimization-based design of bounded-error estimators robust to missing data. IFAC-PapersOnLine, 51(16):157-162, 2018. 6th IFAC Conference on Analysis and Design of Hybrid Systems ADHS 2018.

[11] J. Shamma and K. Y. Tu. Set-valued observers and optimal disturbance rejection. IEEE Trans. on Automatic Control, 44(2):253-264, 1999.

[12] B. Sinopoli, L. Schenato, M. Franceschetti, K. Poolla, M. I. Jordan, and S. S. Sastry. Kalman filtering with intermittent observations. IEEE Trans. on Automatic Control, 49(9):1453-1464, 2004,

[13] J. Skaf and S. P. Boyd. Design of affine controllers via convex optimization. IEEE Trans. on Automatic Control, 55(11):2476-2487, November 2010.

[14] W. Zhang, M. S. Branicky, and S. M. Phillips. Stability of networked control systems. IEEE Control Systems, 21(1):84-99, 2001.

The citation of any document is not to be construed as an admission that it is prior art with respect to the present invention.

What is claimed is:

1. A method for data processing in a system comprising at least one processor and at least one memory, the at least one memory comprising instructions executed by the at least one processor to implement a prefix-based estimator system, the method comprising:
    receiving a plurality of vehicle states at a plurality of time points from at least one sensor coupled to a vehicle, wherein each of the plurality of vehicle states includes at least one parameter, and a discrete state;
    determining a most recent vehicle state of the plurality of vehicle states has at least one missing parameter;
    identifying a prefix comprising a missing data pattern that matches a sequence of discrete states of a subset of time-ordered vehicle states including the most recent vehicle state, wherein the subset of time-ordered vehicle states correspond to the prefix;
    calculating an estimated updated vehicle state of the vehicle using an optimized prefix-based dynamic estimator based on the prefix and the subset of time-ordered vehicle states; and
    providing the estimated updated vehicle state to a driving control system of the vehicle.

2. The method of claim 1, wherein the at least one sensor includes a speedometer.

3. The method of claim 1, wherein the at least one sensor includes a LIDAR sensor.

4. The method of claim 1, wherein the at least one sensor includes a camera.

5. The method of claim 1, wherein the prefix belongs to a language comprising a plurality of prefixes.

6. The method of claim 5, wherein the optimized prefix-based dynamic estimator is optimized to provide a bounded error estimate for all prefixes in the language.

7. The method of claim 1, wherein the optimized prefix-based dynamic estimator is optimized using a Q-parametrization technique.

8. The method of claim 1, wherein the driving control system is an adaptive cruise control system.

9. The method of claim 1, wherein the missing data pattern comprises six discrete states.

10. The method of claim 1, wherein at least one of the time-ordered vehicle states preceding the most recent vehicle state has at least one missing parameter.

11. A driving control system for a vehicle having at least one sensor, the driving control system comprising:
    at least one sensor coupled to a vehicle; and
    a controller in electrical communication with the at least one sensor, the controller being configured to execute a program stored in the controller to:
    (i) receive a plurality of vehicle states at a plurality of time points from the at least one sensor coupled to a vehicle, wherein each of the plurality of vehicle states includes at least one parameter, and a discrete state;
    (ii) determine a most recent vehicle state of the plurality of vehicle states has at least one missing parameter;
    (iii) identify a prefix comprising a missing data pattern that matches a sequence of discrete states of a subset of time-ordered vehicle states including the most recent vehicle state, wherein the subset of time-ordered vehicle states correspond to the prefix;
    (iv) calculate an estimated updated vehicle state of the vehicle using an optimized prefix-based dynamic estimator based on the prefix and the subset of time-ordered vehicle states; and
    (v) provide the estimated updated vehicle state to a driving control system of the vehicle.

12. The system of claim 11, wherein the at least one sensor includes a speedometer.

13. The system of claim 11, wherein the at least one sensor includes a LIDAR sensor.

14. The system of claim 11, wherein the at least one sensor includes a camera.

15. The system of claim 11, wherein the prefix belongs to a language comprising a plurality of prefixes.

16. The system of claim 15, wherein the optimized prefix-based dynamic estimator is optimized to provide a bounded error estimate for all prefixes in the language.

17. The system of claim 11, wherein the optimized prefix-based dynamic estimator is optimized using a Q-parametrization technique.

18. The system of claim 11, wherein the driving control system is an adaptive cruise control system.

19. The system of claim 11, wherein the missing data pattern comprises six discrete states.

20. The system of claim 11, wherein at least one of the time-ordered vehicle states preceding the most recent vehicle state has at least one missing parameter.

* * * * *

UNITED STATES PATENT AND TRADEMARK OFFICE
CERTIFICATE OF CORRECTION

PATENT NO. : 11,440,543 B2
APPLICATION NO. : 16/256270
DATED : September 13, 2022
INVENTOR(S) : Necmiye Ozay et al.

It is certified that error appears in the above-identified patent and that said Letters Patent is hereby corrected as shown below:

In the Specification

Column 5, Line 23, "$F_{(1)}$" should be --$F^{(1)}$--.

Column 5, Line 27, "$Q^{(i)}=F^{(i)}(I-C_{(i)}SF_{(i)})^{-1} \forall i \in \{1,2\}$" should be --$Q^{(i)}=F^{(i)}(I-C^{(i)}SF^{(i)})^{-1} \forall i \in \{1,2\}$--.

Column 5, Line 37, "$BM_j(F_{(1)})$" should be --$BM_j(F^{(1)})$--.

Column 7, Line 47, "$|\mathbb{B}|=1$" should be --$|\mathcal{L}|=1$--.

Column 7, Line 65, "$\mathbb{B}'$ with $|\mathbb{B}|>1$" should be --$\mathcal{L}'$ with $|\mathcal{L}'|>1$--.

Column 7, Line 66, "$\mathbb{B}^*=\{\sigma^*\}$" should be --$\mathcal{L}^*=\{\sigma^*\}$--.

Column 7, Line 67, "$\mathbb{B}'$" should be --$\mathcal{L}'$--.

Column 8, Line 3, "$\mathbb{B}'=\{\sigma_1, \sigma_2\}$" should be --$\mathcal{L}'=\{\sigma_1, \sigma_2\}$--.

Column 8, Line 60, "$F_{(t,\tau)}$" should be --$\overline{F}_{(t,\tau)}$--.

Column 9, Line 9, "$(Q^{(|\mathbb{B}|)}, r^{(|\mathbb{B}|)})$" should be --$(Q^{(|\mathcal{L}|)}, r^{(|\mathcal{L}|)})$--.

Column 9, Line 10, "$[1,|\mathbb{B}|]$" should be --$[1,|\mathcal{L}|]$--.

Column 10, Line 4, "$\mathcal{BM}(F)$" should be --$\mathcal{BM}_j(F)$--.

Column 10, Line 17, "$F(L)$" should be --$F^{(i)}$--.

Signed and Sealed this
Twenty-fourth Day of January, 2023

Katherine Kelly Vidal
*Director of the United States Patent and Trademark Office*

CERTIFICATE OF CORRECTION (continued)
U.S. Pat. No. 11,440,543 B2

Column 12, Line 47, "Mac" should be --iMac--.

Column 13, Line 37, "MAR" should be --LiDAR--.

Column 14, Line 54, "$\mathbb{B}$" should be --$\mathcal{L}$--.

Column 14, Line 59, "$\mathbb{B}$" should be --$\mathcal{L}$--.

Column 14, Line 60, "$\mathbb{B}$" should be --$\mathcal{L}$--.

Column 16, Line 44, "LIDAR" should be --LiDAR--.

Column 18, Line 4, "M" should be --$M_1$--.

Column 19, Line 20, "PooIla" should be --Poolla--.